(12) United States Patent
Hadas

(10) Patent No.: US 9,937,666 B2
(45) Date of Patent: Apr. 10, 2018

(54) SYSTEMS AND METHODS FOR FORMING THREE DIMENSIONAL OBJECTS

(71) Applicant: Empire Technology Development LLC, Wilmington, DE (US)

(72) Inventor: Noam Hadas, Tel-Aviv (IL)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 621 days.

(21) Appl. No.: 14/296,380

(22) Filed: Jun. 4, 2014

(65) Prior Publication Data

US 2015/0352790 A1 Dec. 10, 2015

(51) Int. Cl.
| | |
|---|---|
| *B29C 67/00* | (2017.01) |
| *G05D 7/06* | (2006.01) |
| *G05B 15/02* | (2006.01) |
| *B29C 64/106* | (2017.01) |
| *B29C 64/386* | (2017.01) |
| *B33Y 50/02* | (2015.01) |

(52) U.S. Cl.
CPC ........ *B29C 67/0088* (2013.01); *B29C 64/106* (2017.08); *B29C 64/386* (2017.08); *G05B 15/02* (2013.01); *B33Y 50/02* (2014.12); *G05B 2219/49023* (2013.01)

(58) Field of Classification Search
CPC . B29C 67/0088; B29C 67/0055; G05B 15/02; G05B 2219/49023; G05D 7/0635; B33Y 50/02
See application file for complete search history.

(56) References Cited

U.S. PATENT DOCUMENTS

| | | |
|---|---|---|
| 5,529,471 A | 6/1996 | Khoshevis |
| 6,612,824 B2 | 9/2003 | Tochimoto et al. |
| 8,470,231 B1 | 6/2013 | Dikovsky et al. |
| 2008/0182011 A1 | 7/2008 | Ng et al. |
| 2010/0140849 A1 | 6/2010 | Comb et al. |
| 2010/0191360 A1 | 7/2010 | Napadensky et al. |
| 2010/0208016 A1 | 8/2010 | Menchik et al. |
| 2013/0234369 A1 | 9/2013 | Schwarzler |
| 2013/0341611 A1 | 12/2013 | Moon |

FOREIGN PATENT DOCUMENTS

WO    WO-2004/016438    2/2004

OTHER PUBLICATIONS

International Search Report and Written Opinion in International Application No. PCT/IB2015/054100 dated Oct. 1, 2015 (16 pages).
Hornick, J. and Roland, D., "Many 3D Printing Patents Are Expiring Soon: Here's a Round up & Overview of Them," Accessed at http://3dprintingindustry.com/2013/12/29/many-3d-printing-patents-expiring-soon-heres-round-overview/, Dec. 29, 2013, pp. 1-13.

*Primary Examiner* — Robert J Grun
(74) *Attorney, Agent, or Firm* — Maschoff Brennan

(57) ABSTRACT

The present technology provides a three-dimensional (3D) printing system for forming 3D objects. The system includes a base plate, a first nozzle, a second nozzle, and a curing agent. The first nozzle can be configured to form a base layer of an object on the base plate and to form a contour of a second layer of the object on the base layer with a first material. The contour defines a volume within the second layer. The second nozzle can be configured to at least partially fill the volume within the second layer with a second material. The contour of the second layer and the second material form the second layer. The curing agent can be configured to solidify the second material.

12 Claims, 5 Drawing Sheets

SYSTEMS AND METHODS FOR FORMING THREE DIMENSIONAL OBJECTS

BACKGROUND

The following description is provided to assist the understanding of the reader. None of the information provided or references cited is admitted to be prior art.

Three dimensional (3D) printing is a manufacturing process that builds layers to create a 3D object from a digital model. To print a 3D object, the manufacturer can use software to create a digital model that gets sliced into very thin cross-sections called layers. The instructions for each layer can then be transmitted to a 3D printing system to print the 3D object.

In stereo lithography (STL) three-dimensional printing, a print-head moves in the X/Y plane and injects a material on a platform moving in the Z axis. These printers are improving at a fast rate, offering higher spatial resolution and accuracy, faster speeds and better materials almost every week. However, the parts produced by STL 3D technology can take a very long time to complete. Small objects sometimes take long hours to complete, while larger objects often require a few days to complete. The time constraint forces a trade-off between high resolution and accuracy, to quick turnaround, as well as forces the machines to operate unattended for prolonged periods during off-business hours. Additionally, the limitation on production speed can be a major contributor to final part costs.

SUMMARY

The present technology provides a three dimensional (3D) printing system. The 3D printing system includes a base plate, a first nozzle, a second nozzle, and a curing agent. The first nozzle can be configured to form a base layer of an object on the base plate and to form a contour of a second layer of the object on the base layer with a first material. The contour can define a volume within the second layer. The second nozzle can be configured to at least partially fill the volume within the second layer with a second material. The contour of the second layer and the second material forms the second layer. The curing agent can be configured to solidify the second material.

The present technology further provides a method for forming a 3D object. The method includes forming, by a first nozzle, a base layer of an object. The method further includes forming, by the first nozzle, a contour of a second layer of the object on the base layer. The contour defines a volume within the second layer. The method further includes filling, by a second nozzle, at least a portion of the volume within the second layer of the object with a material. The contour and the material form the second layer. The method further includes solidifying, by a curing agent, the material in the second layer of the object.

The present technology further provides a method for creating a 3D printing system. The method includes coupling a first nozzle to a support structure. The first nozzle can be configured to form a base layer of an object and to form a contour of a second layer of the object with a first material. The contour defines a volume within the second layer. The method further includes coupling a second nozzle to the support structure, the second nozzle configured to at least partially fill the volume within the second layer with a second material. The contour and the second material form the second layer. The method further includes coupling a curing agent to the support structure. The curing agent can be configured to solidify the second material. The method further includes connecting a base plate to a bottom portion of the support structure.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are; therefore, not to be considered limiting of its scope, the disclosure will be described with additional specificity and detail through use of the accompanying drawings.

DETAILED DESCRIPTION

Figure 1:
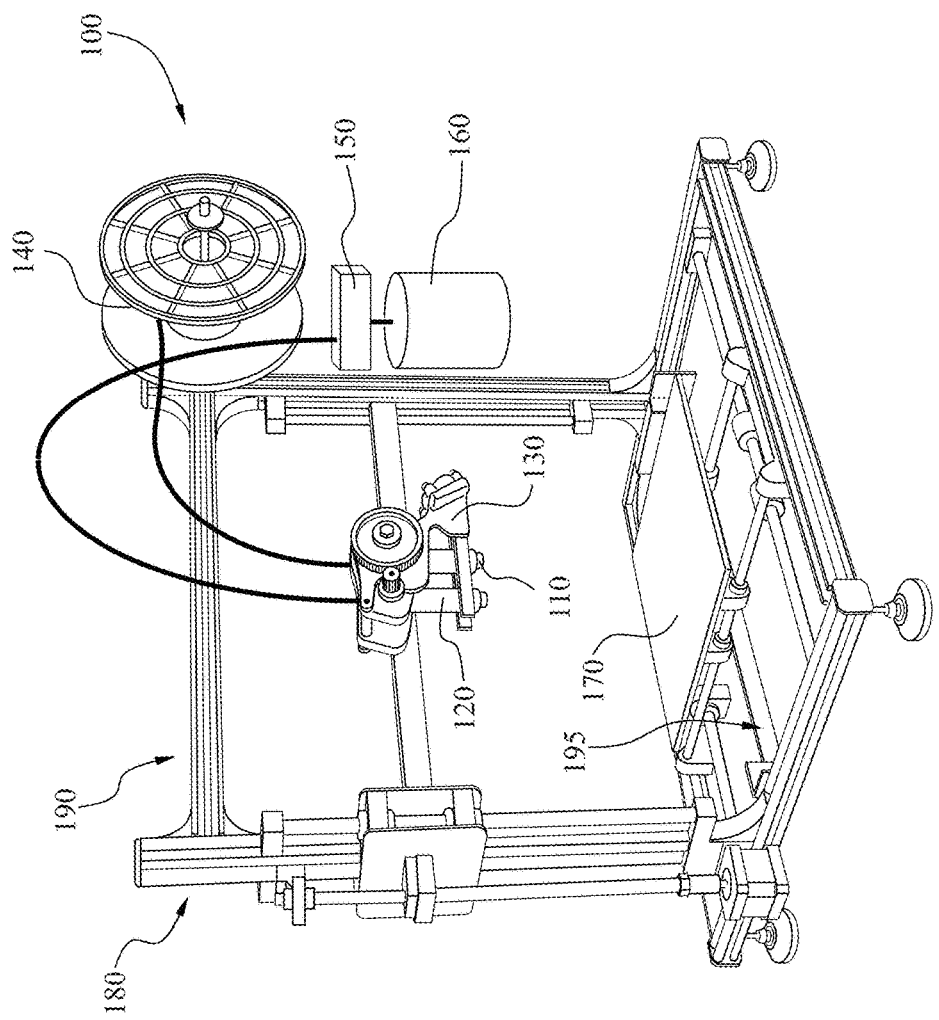
FIG. 1 depicts a three-dimensional (3D) printing system for forming an object in accordance with an illustrative embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Three dimensional (3D) printing is a manufacturing process that builds layers to create a 3D object from a digital model. To print a 3D object, the manufacturer can use software to create a digital model that gets sliced into very thin cross-sections called layers. The instructions for building each layer can then be transmitted to a 3D printing system to print the 3D object.

In one embodiment, the disclosed embodiments are directed to an approach to create three-dimensional objects by separating the production process of the contour of the object from the production process of the volume of the object. The contour may be created by having a printing head dispense a thread of molten material, for example a thermoplastic polymer, along an outline of the object cross-section at a respective level, or layer of the object. Once the contour of the level is completed, the resulting shallow tub formed by the contour, may be filled with a low-viscosity polymer, for example, an ultra-violet (UV) curable polymer. The UV curable polymer can be exposed to a UV light as the printing head makes the contour of the next layer. This approach can allow the entire volume of a level of the object to be filled in about the same time it takes to draw the contour. In some embodiments, this approach can fill several layers in a single step and cure the layers at the same time. This process can shorten the length of time to print a 3D object, while improving the surface quality of the printed 3D object and improving the accuracy of the 3D printing process. Further, the printing is more accurate and has a better surface quality because the time saved allows the first printing head to be operated at a reduced speed.

FIG. 1 depicts an embodiment of a three-dimensional (3D) printing system 100 for forming an object in accordance with an illustrative embodiment. In an embodiment, the 3D printing system 100 can create a 3D object. The 3D printing system 100 may include a first nozzle 110, a second nozzle, 120, a curing agent 130, a base plate 170, and a support structure 180. In some embodiments, the first nozzle 110 and the second nozzle 120 can form a printing head for creating 3D objects. The first nozzle 110 can be configured to form a base layer of an object on the base plate 170. In some embodiments, the first nozzle 110 can be configured to form a contour of a second layer of the object on the base layer with a first material. The contour of the second layer may define the volume of the second layer. The contour may include the external surface of the second layer. In some embodiments, contours are printed in the internal volume of a layer to create wall inside an internal void of the layer. The wall can divide the internal volume of the layer into different parts.

In some embodiments, the first nozzle 110 can be configured to move to trace the contour of the object to be printed. In an embodiment, the first nozzle 110 may be configured to form a contour of a third layer on the object on at least a portion of the second layer with the first material, the contour defining a volume within the third layer. The dimensions of the contour of the third layer may be the same as the dimensions of the contour of the previous layer. In other embodiments, the dimensions of the contour of the third layer may deviate from the dimensions of the previous layer.

In an embodiment, the first nozzle 110 can be configured to form a contour of a third layer of the object outside at least one of the contour of the first layer and the contour of the second layer. The dimensions of the contour of the third layer may be greater than the dimensions of the contour of the second layer. In other embodiments, the dimensions of the contour of the third layer may be less than the dimensions of the contour of the second layer. In some embodiments, the first nozzle 110 can be configured to form the contour of the third layer at substantially the same time as solidifying of the material in the second layer.

In an embodiment, the first nozzle 110 and the second nozzle 120 can be devices designed to control the dispensing of a material, including the direction and/or characteristics of a fluid flow (for example, the spray pattern, or thorough heating of a solid material to convert it to a liquid form, and then lay a line of liquid material at the desired places). In some embodiments, the first nozzle 110 is made up of metal, ceramic or similar materials suitable for high temperature operation. The first nozzle 110 is configured to dispense the first material. In an embodiment, the first nozzle 110 is configured to melt the first material as it is dispensed. The first material may include thermoplastic material such as a thermoplastic polymer (for example, melted plastic wire). In some embodiments, the first material may have a melting temperature of 150 Celsius (° C.). In an embodiment, the first material is fed to the first nozzle 110 from a reel 140. The reel 140 may be coupled to the support structure 180. In an embodiment, the reel 140 can be configured to hold a spool of plastic wire.

In an embodiment, the first nozzle 110 may be coupled to a track 190 on the support structure 180. The first nozzle 110 can be configured to move horizontally along the track 190 to dispense the first material. The track 190 can be moved vertically along the vertical poles of the support structure to change an elevation level of the first nozzle 110. In some embodiments, the dimensions (for example, length, height) of the track 190 can be adjusted according to the dimensions of the object to be created. To adjust the dimensions of the track 190, the support structure 180 dimensions can be adjusted, such as changing a size of the support structure 180. For example, in one embodiment, the support structure 180 may include two vertical poles. The distance between the vertical poles may be adjusted (for example, increased, decreased) to adjust the dimensions of the track 190. In an embodiment, the track 190 can be configured to move up and down on the support structure 180. The track 190 can be configured to slide up and down the vertical poles of the support structure 180 to adjust the distance from the first nozzle 110 from the base plate 170. In an embodiment, the track 190 is configured to move in any combination of axis and motion to position the first nozzle 110 and the second nozzle 120 according the desired application.

In an embodiment, the first nozzle 110 may move independent of the second nozzle 120. In other embodiments, the first nozzle 110 may be coupled to the second nozzle 120. The first nozzle 110 and the second nozzle 120 can move together. In some embodiments, the first nozzle 110 and the second nozzle 120 can both be configured to move in accordance with the shape of the object being created.

In an embodiment, the second nozzle 120 can be configured to at least partially fill the volume within the second layer with a second material. The contour of the second layer can be filled with the second material to form the second layer of the object. In some embodiments, the second nozzle 120 can dispense the second material at a rate of about a few microliters per second. The second material may include at least one of an ultra-violet (UV) curable material, a heat curable material, or a dual component material. In one embodiment, the UV curable material is a UV-curable photopolymer, such as stereolithography (SLA) resin. In other embodiments, the second material is a thermoplastic polymer, such as polyethylene, polypropylene, acrylonitrile butadiene styrene (ABS), or polylactic acid (PLA). In other embodiments, the second material is a thermoplastic elastomer, such as polyamide. In an embodiment, the UV curable polymer can be solidified due to exposure to UV light. The curing temperature of the second material may be lower than a melting temperature of the first material. In some embodiments, the second nozzle can be configured to at least partially fill the volume within the third layer with the second material, the contour of the third layer and the second material forming the third layer.

The heat curable material may be curable with an application of heat. In one embodiment, the heat curable material is a polyurethane. In an embodiment, the heat curable material may have a curing temperature lower than the melting temperature of the contour of the layer. In an embodiment, dual component material can be material that solidifies by mixing two components in the dispensing nozzle (for example, the second nozzle 120). The dual component material may include a thermoplastic elastomer. The thermoplastic elastomer is a mix of materials with thermoplastic properties and materials with elastomeric properties. In some embodiments, the second material can have a low viscosity characteristic and/or a fast curing characteristic.

In an embodiment, the second nozzle 120 may be coupled to a dispensing pump 150 and a reservoir 160 via a conduit. In one embodiment, the dispensing pump 150 may be coupled to the second nozzle 120 via a conduit. The dispensing pump 150 can be coupled to the reservoir 160. The reservoir can be configured to hold the second material. In an embodiment, the conduit may be at least one of a tube, a siphon, or a pipe. The reservoir 160 can be configured to hold the second material prior to dispensing. In an embodiment, the reservoir 160 can be coupled to the support structure 180. In some embodiments, the reservoir 160 can be configured to hold several hundred milliliters (ml) of the second material. In an embodiment, the reservoir 160 may be made up of plastic, metal or glass material. In some embodiments, the dispensing pump 150 may control the flow of the second material from the reservoir 160 to the second nozzle 120. In an embodiment, the dispensing pump 150 can be coupled to the support structure 180. In one embodiment, the dispensing pump 150 can be coupled to the support structure 180 such that the dispensing pump 150 is located between the reservoir 160 and the second nozzle 120. The dispensing pump 150 can be configured to pump the second material at a rate of about a few microliters per seconds. The volume of the second material is calculated as part of the printing instructions to the printer to exactly fill the volume of the second layer, resulting in a flat surface inside the layer. An optical sensor can be used to monitor the edge where the second material meets the contour of the first material, and adjust the dispensing volume until the fluid level is flush with the height if the contour plastic.

In an embodiment, the second nozzle 120 may be coupled to the track 190 on the support structure 180. The second nozzle 120 can be configured to move horizontally along the track 190 to dispense the second material. The track 190 can be adjusted, as described above with respect to the first nozzle 110, to allow the second nozzle 120 greater range of motion, such as adjusting the track 190 vertically to change an elevation level of the second nozzle 120. In other embodiments, the second nozzle 120 may be located on a fixed point on the track 190.

In an embodiment, the curing agent 130 can be coupled to the track 190. The curing agent 130 can be configured to solidify the second material. In some embodiments, the curing agent 130 can be a radiation source such as an ultraviolet (UV) source (for example, UV heat lamp). In an embodiment, the curing agent 130 can be configured to be continuously active during dispensing of the second material. In some embodiments, the curing agent 130 can turn off during dispensing of the first material.

In an embodiment, the base plate 170 can be coupled to a base of the support structure 180. The object can be created on the base plate 170. In some embodiments, the base plate 170 can be configured to move horizontally along a second track 195. The second track can be coupled to the base of the support structure 180. The base plate 170 can be coupled to the second track 195 and be configured to move horizontally along the second track 195. The second track 195 can be configured to move vertically along the vertical poles of the support structure 180 to change an elevation level of the base plate 150. In other embodiments, the base plate 170 can be configured to remain stationary during dispensing of materials. In an embodiment, the base plate 170 can include at least one of metal, plastic or any other suitable material.

In an embodiment, the 3D printing system 100 may further include at least one blade. In some embodiments, the blade may be coupled to the first nozzle 110 or the second nozzle 120. The blade can be coupled to the second nozzle such that the blade is positioned above the second layer of the object. The blade can be configured to level the second layer of the object. The blade may pass over the second layer of the object to level out the second material of the second layer. In other embodiments, the blade may be coupled to the support structure 180. In an embodiment, the base plate 170 can be configured to move laterally under the blade to level the second layer of the object so that the blade can level the second layer of the object. In some embodiments, the blade can be a straight edge. In other embodiments, the blade can have a sloped edge. The blade can be made to vibrate at a high rate in order to lower the viscosity of the second material, allowing better leveling action.

In an embodiment, the 3D printing system 100 may further include a vibrating element. The vibrating element may be coupled to the base plate 170. In an embodiment, the vibrating element can be configured to vibrate the base plate 170 to even out the second material as it is dispensed and cause the second material to spread evenly. In some embodiments, the vibrating element can be configured to be activated or deactivated according to which nozzle is dispensing material. In one embodiment, the vibrating element can deactivate when the first nozzle 110 is dispensing the first material. In another embodiment, the vibrating element can activate when the second nozzle 120 is dispensing material.

In an embodiment, the 3D printing system 100 may further include at least one processor. The processor can be configured to control operation of the 3D printing system 100. In some embodiments, the processor can be configured to control operation of the first nozzle 110 and the second nozzle 120. In an embodiment, the processor can be communicatively coupled to the first nozzle 110 and the second nozzle 120. The processor can be configured to control operation of the first nozzle and the second nozzle. In some embodiments, the processor can be configured to calculate an amount of second material to fill the volume of the second layer of the object. In an embodiment, the processor can be configured to transmit a command to the dispensing pump 150. The command may include an instruction with the calculated amount of second material to fill the volume of the second layer. In some embodiments, the processor can be configured to control operation of the curing agent 130. The processor can transmit commands to the curing agent 130 to turn the curing agent 130 on or off at specified times. In an embodiment, the processor can be similar to and operate similar methods as the processor described below with respect to FIG. 5.

In an embodiment, the 3D printing system 100 may further include at least one motor. The motor may include at least one of a stepper motor, a servo motor, and a DC electric motor. In some embodiments, the 3D printing system 100 may include multiple motors to control operation of different components of the 3D printing system. The motor can control the movement and operation of the first nozzle 110, the second nozzle 120, the dispensing pump 150, the base plate 170, and the track 190. The motor can move the first nozzle 110 and the second nozzle 120 horizontally along the track 190. In some embodiments, the motor can move the track 190 vertically up/down the vertical poles of the support structure 180 to change an elevation of the either the first nozzle 110 or the second nozzle 120 or both. The motor can move the base plate 170 in a horizontal motion along the second track 195 and can move the second track 195 vertically to change an elevation level of the base plate 170. The motor can control the rate at which the dispensing pump 150 pumps the second material to the second nozzle 120 via the tube.

The motor can be configured to move continuously or in increments measured in degrees. The increments can vary depending on the application. In an embodiment, a smaller step motor can be used to improve overall accuracy and surface quality of the object. In one embodiment, the stepper motor can be configured to form several contour layers with the first material before filling in an internal volume of the object with the second material, such as when the contours of the object may have a desired thickness. The system 100 provided offers one type of system for 3D printing, but one of skill in the art may readily appreciate that the present methods described herein can be applied to any type of 3D printing device or system.

Figure 2:
FIG. 2 depicts a flow diagram of a method for forming an object in accordance with an illustrative embodiment.

FIG. 2 depicts an embodiment of a flow diagram of a method for forming an object. In some embodiments, the object may be a 3D object. In a brief overview, the method includes forming a base layer of an object 210, forming a contour of a second layer of the object 220, filling at least a portion of the volume of the second layer of the object 230, and solidifying the second layer of the object 240.

In some embodiments, the method includes forming a base layer of an object 210. The base layer may be the first layer of the object. In some embodiments, the base layer may define a shape of the object. Forming the base layer may include printing a contour of the base layer by a first nozzle. In some embodiments, the method includes tracing, by the first nozzle, a base layer contour with the first material. In an embodiment, the first material may be a thermoplastic polymer, such as a heated plastic material. The first material may be exposed to heat prior to entering the nozzle, or while inside the nozzle, to melt the first material.

In one embodiment, the material used to print the contour of the base layer may be a thermoplastic material such as a thermoplastic polymer. In some embodiments, once the contour of the base layer has been printed, the contour of the base layer may be filled in with an ultra-violet (UV) curable polymer. In an embodiment, filling in the base layer may include dispensing material within a volume of the base layer by a second nozzle. The volume of the base layer may be defined by the dimensions of the contour of the base layer. For example, in an embodiment, the volume of the base layer may be defined as the volume between the surface the base layer is printed on, the contour of the base layer, and a plane at the top of the contour-forming plastic edge. In some embodiments, the thickness (for example, depth) of the base layer may be about 0.1 mm to about 1 mm, for example about 0.1 mm, about 0.2 mm, about 0.3 mm, about 0.4 mm, about 0.5 m, about 0.6 nm, about 0.7 mm, about 0.8 mm, about 0.9 mm, about 1 mm, or any thickness between any of the stated values. In an embodiment, the thickness of the base layer may be about 0.2 mm to about 0.4 mm. The depth and thickness may generally be any distance.

In some embodiments, a printing head can be configured to form the base layer and may include two nozzles (for example, the first nozzle 110, the second nozzle 120). In an embodiment, the first nozzle can be configured to move when dispensing a first material and the second nozzle can be in a fixed position when dispensing a second material. In one embodiment, the second nozzle may be located over a center of the contour of the base layer when dispensing the second material (for example, UV curable polymer) or at any other preferable point inside the contour of the layer. The controller may be used to calculate the flow pattern of the second material in the volume of the current layer, and position the second nozzle either in a single location, or in a moveable location, as well as control the dispensing rate, so as to achieve the smoothest and fastest filling process possible under the current shape, material used and temperature.

In other embodiments, filling in the base layer may include filling in the base layer with regular patterns of parallel lines using the first material dispensed from the first nozzle 110. In some embodiments, the first material defining the contour of the base layer and the second material filling in the base layer may be different. In an embodiment, the first material may include thermoplastic polymer. The second material may include at least one of a heat curable material, dual component material, an ultra-violet (UV) curable polymer, and a combination thereof. In other embodiments, the first material defining the contour of the base layer can be used to fill in the base layer, such that the base layer is made up entirely of the first material.

The base layer may be formed on a base plate. The base plate may be a flat surface for printing a 3D object. In an embodiment, the base plate does not move horizontally so that there is no deformation of the individual layers of the object as they solidify over time. In other embodiments, the base plate may be configured to move while either the first nozzle or the second nozzle is dispensing material. The size of the base plate may depend on the dimensions of the object to be formed. In some embodiments, the base plate may include a heated surface. The surface of the base plate may be heated during a printing process to improve the curing time for the base layer and subsequent layers of the object.

In some embodiment, the method includes forming a contour of a second layer of the object 220 on the base layer. The contour may define a volume within the second layer. In an embodiment, the contour of the second layer can be made up of thermoplastic material and formed by the first nozzle. The first nozzle can melt the first materials as it is dispensed. The first material can be dispensed as a thin thread of melted plastic and solidify as it is comes in contact with the base plate or a previous layer of the object. In one embodiment, the contour of the second layer can be the same material as the contour of the base layer. In some embodiments, the second layer may be a subsequent layer to the base layer. The printing speed of contours of different layers of the object can vary from one layer to the next. The printing process can be customized to establish a unique printing rate for each layer of the object based on the dimensions of the layer and the material making up the layer. In an embodiment, the contour of an individual layer of the object can be printed at a slow rate due to the time saved with the methods described herein.

In an embodiment, the contour of the second layer of the object may define the shape of the second layer of the object. The thickness (for example, depth) of the contour of the second layer may be about 0.1 mm to about 1 mm, for example about 0.1 mm, about 0.2 mm, about 0.3 mm, about 0.4 mm, about 0.5 m, about 0.6 nm, about 0.7 mm, about 0.8 mm, about 0.9 mm, about 1 mm, or any thickness between any of the stated values. In an embodiment, the thickness of the contour of the second layer may be about 0.2 mm to about 0.4 mm. The depth and thickness may generally be any distance.

In some embodiments, a contour of a subsequent layer of the object can be formed on the previous layer of the object. The dimensions of the contour of the subsequent layer may have larger dimensions than the dimensions of the contour of the previous layer. A supporting structure can be built and attached to the previous layer to support the larger subsequent layer during the printing process. The previous layers may need support until they are cured and strong enough to support the subsequent layers printed on top of them. In an embodiment, a support layer may be applied to the previous layer prior to forming the contour of the subsequent layer. The first nozzle 110 can be configured to form the support layer between a third contour layer and at least one of the contour of the first layer and the contour of the second layer. The support layer may be partially applied to the previous layer prior to forming the contour of the subsequent layer. The support layer may aid the base layer in supporting the weight of the second layer of the object.

In some embodiments, the first nozzle 110 can be configured to form a contour of the support layer outside of the dimensions of the first layer and the second layer. The second nozzle 120 can fill in this contour of the support layer with a UV curable material that is easily removed by peeling or with solvent. In an embodiment, the support layer is created to be easily removed once the printing process is complete. The support layer provides support for the various layers while the layers are curing. Once all the layers have cured, the support layer is removed without damaging the completed object.

In other embodiments, the contour of the subsequent layer may be smaller than the contour of the previous layer. In such an embodiment, the contour of the subsequent layer may be partially formed over the cured material filling in the base layer. In some embodiments, the contour of the second layer of the object may be printed prior to the base layer completely solidifying. In an embodiment, the base layer may retain an adhesive characteristic to aid in coupling to the contour of the second layer of the object.

The method further includes filling at least a portion of the volume of the second layer within the second layer of the object 230 with a material, the contour and the material forming the second layer. In an embodiment, the volume of the second layer may be defined by the dimensions of the contour of the second layer. For example, in one embodiment, the volume can be defined as an internal volume between the base layer, the contour of the second layer, and a plane at the top of the contour-forming plastic edge. In some embodiments, the second layer of the object 230 may be filled with the second material. The second material may be a liquid material. In an embodiment, the volume of the second layer may be filled with at least one of a dual component material, a UV curable polymer, and a heat curable material.

In some embodiments, when the second layer is filled with a liquid material there is complete filling of the internal volume of the second layer. In some objects produced using STL 3D printing, there can be voids in the volume of individual layers of the object, decreasing the strength of the individual layers that make up an object. By using a liquid material, the complete filling of the second layer can insure high strength body with well-defined mechanical properties for the individual layers that make up an object.

In some embodiments, the volume of the second layer may be completely filled before printing the contour of a subsequent layer. The method includes dispensing, by the second nozzle, the second material until the volume of the second layer is at least partially filled. In some embodiments, the dispensing of the second material does not need to be extremely accurate for each individual layer as volume errors can automatically average themselves out after several layers. In some embodiments, the volume of the second layer may be filled to a pre-determined point below the total volume of the second layer of the object. In other embodiments, the volume of the second layer may be completely filled.

The printing surface (for example, the base plate) on which the individual layers are printed on may be leveled to prevent build-up of the second material on one side more than another side due to an unevenness of the printing surface. In some embodiments, if the printing surface is uneven, the unevenness can be compensated by filling in each layer a little less than full volume. The adhesion forces of the second material can be used to bring the second material of an individual layer to the corresponding level of the contour of the individual layer. Alternatively, the base plate may be made to rotate by some angle after each layer is dispensed, so the average inclination of the part is zero over many layers.

In some embodiments, a vibrating element may be coupled to the base plate. In an embodiment, the method further comprises vibrating, by the vibrating element, the base plate to evenly distribute the material across the volume defined by the contour of the second layer of the object. In some embodiments, the vibrating element may vibrate the base plate at a frequency of about 1 Hz to about 100 Hz, at accelerations of about 0.01 g to about 0.1 g. In an embodiment, the vibrating element may include at least one of an electromagnetic actuator, a motor with an off-center weight, a Piezo-electric actuator.

In some embodiments, the method further includes leveling, by a blade, the second layer of the object prior to creating the contour of the third layer of the object. In some embodiments, the blade may be coupled to the second nozzle. In other embodiments, the blade may be coupled to the first nozzle. In an embodiment, the blade may be positioned above the second layer of the object to evenly distribute the material dispensed within the border of the contour of the second layer of the object. In other embodiments, the blade may be coupled to the base plate. In some embodiments, the base plate may be configured to move sideways under the blade to level a newly dispensed layer of the object. In an embodiment, the blade may be at a fixed height. In other embodiments, the blade may be moveable responsive to the size of the object and a number of layers of the object. In an embodiment, the size of the blade may correspond to the measurements of the object and the measurements of each individual layer of the object.

In some embodiments, the method includes solidifying the material in the second layer of the object 240. The volume of the second layer of the object may be solidified by a curing agent. In some embodiments, the curing agent may be an ultra-violet (UV) source (for example, UV lamp). Solidifying the material in the second layer of the object may include exposing the material in the second layer of the object to radiation from a UV lamp to heat or a combination thereof. The curing agent can apply heat to the individual layers of the object to solidify them. By using a curing agent, there is less deformation to the individual layers of the object because there is no cooling of the internal volume of the individual layers. When there is cooling, the internal volume may shrink and pull on the external surfaces in contact with the individual layers. This pulling action can cause deformation to the structure of the object. In an embodiment, the second material may hardly shrink as it is cured. The intensity of the curing agent can be configured to completely solidify the material in the second layer of the object after one or more additional layers have been formed on top of the second layer.

The curing agent can be configured to provide radiation at an intensity that partially solidifies the material in the second layer of the object such that a surface of the material in the second layer of the object retains an adhesive characteristic for coupling the second layer of the object to a third layer of the object. In an embodiment, the second layer may be only partially solidified to ensure good adhesion to a subsequent layer to be formed on top of the second layer. In one embodiment, partially solidified when the second layer of the object is 80% cured. In other embodiments, the second layer may be considered partially solidified when it is at least about 70% cured.

In some embodiments, the curing agent may be programmed to be inactive after a pre-determined time to ensure the material in the volume of the second layer is only partially solidified. The pre-determined time may be a curing time that it takes for the second layer of the object to be partially solidified. The curing time can depend on the material in the second layer. In some embodiments, the pre-determined time may be when the second layer is strong enough to support another layer of the object on top of it. In one embodiment, the second layer of the object may be strong enough to support another layer when it is at least about 80% cured. In some embodiments, the intensity of the curing agent can be adjusted to only cure each layer after several additional layers have been placed on top of it. In an embodiment, the curing agent can be programmed to solidify the second layer of the object until it can support another layer on top of it.

In some embodiments, a contour of the third layer of the object may be formed on at least a portion of the second layer. The contour may define a volume within the third layer. In an embodiment, the forming of the contour of the third layer occurs at substantially the same time as solidifying of the material of the second layer. In one embodiment, when the second layer of the object is being cured, a contour of a subsequent layer may be printed. In some embodiments, the contour of the subsequent layer may be printed at substantially the same time the volume of the previous layer is cured. In an embodiment, an amount of time to solidify the second layer is about the same as an amount of time required to form the contour of the third layer. The volume within the third layer can be at least partially filled with the second material, the contour of the third layer and the second material forming the third layer.

In some embodiments, an outer surface of the object can be washed off with a solvent. The outer surface may be washed off once the object has been completed and the internal volume filled with the second material has been cured. In some embodiments, individual layers or groups of individual layers can be washed with the solvent prior to the entire object being completed. The solvent can wash away the outer skin of the first material leaving the surface of the object as solvent resistant. In some embodiments, the solvent can wash away entirely the first material defining the outer surface of the object, exposing the cured second material. The second material (for example, UV curable polymer) can be more solvent resistant than the first material. In other embodiments, the outer skin of the first material can be washed away with a solvent to leave a transparent surface on the object. In some embodiments, the transparent surface can be the exposed second material. In an embodiment, the transparent surface can then be modified, for example, by being painted.

In some embodiments, the object can be customized after it has been printed. In an embodiment, sections of the outer surface of the object can be removed, such as by a machine, to customize the object. In some embodiments, the object can be customized by coupling various features or devices to the surface of the object. In one embodiment, light guides or lenses can be printed. The part internal transparent volume can act as a light guide to achieve certain visual effects. In other embodiments, the light-emitting diodes (LED) can be coupled to the surface of the object. The LEDs lighted part can act as lighted decals, knobs, or buttons on the object.

In some embodiments, the internal volumes of each of the layers is divided into several, independent volumes, by printing a grid inside the internal volumes. The grid divides the internal volume of the layer into several areas of equal volume. Depending on the dimensions of the layer, one or more than one grid may be printed inside the internal volume. To fill in the volume of the areas of the internal volume a pump (for example, a syringe pump) can be used. The pump may be in addition to the second nozzle. The use of grids and pumps may further increase printing speed by allowing the volumes to be filled faster using several pumps for an individual layer to achieve a higher fill rate and still be sure of complete filling of the entire volume. The larger the object and the larger the individual layers of the object may increase the need to use grids.

Figure 3:
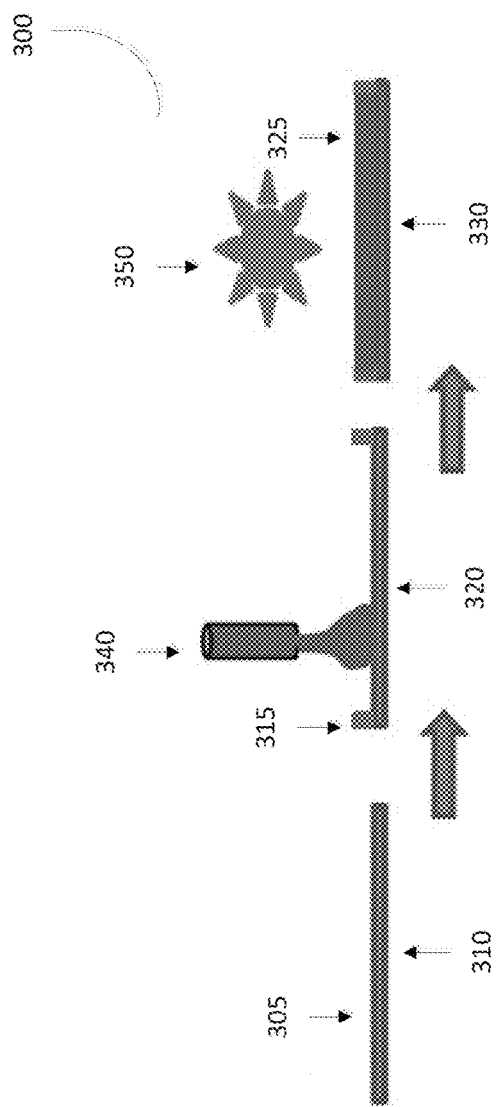
FIG. 3 depicts a system for forming a 3D object in accordance with an illustrative embodiment.

FIG. 3 depicts an illustration of an embodiment of forming a 3D object. In more detail, FIG. 3 includes 3 operations of forming the 3D object. In a first operation 310, a base layer 305 is created on a base plate. The base layer 305 may be created by a first nozzle. In some embodiments, the base layer may include molten plastic polymer. In an embodiment, the base layer may include the same material as the contour of the different layers of the object. In a second operation 320, a contour 315 of a second layer of the object can be created on the base layer 305. In an embodiment, the contour 315 can be created by the first nozzle. The contour 315 may define a volume of the second layer of the object. In some embodiments, once the contour 315 of the second layer is complete, a second nozzle 340 may dispense the second material to fill the volume of the second layer. In an embodiment, the second material may include UV curable polymer. In a third operation 330, the volume of the second layer can be placed under a curing agent 350 to solidify the second layer 325 of the object. In some embodiments, while the volume of the second layer is under the curing agent 350, a contour of a third layer can be created simultaneously.

Figure 4:
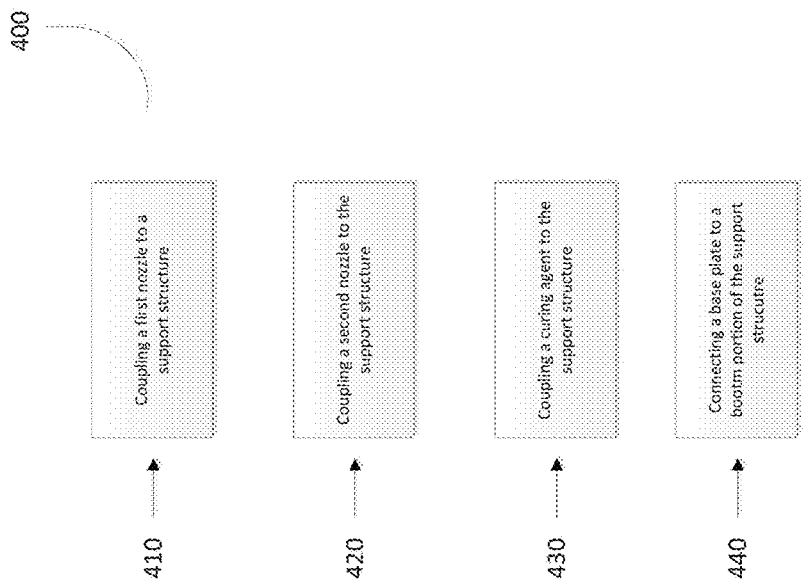
FIG. 4 depicts a flow diagram of a method for creating a 3D printing system in accordance with an illustrative embodiment.

FIG. 4 depicts an embodiment of a flow diagram of a method 400 for creating a 3D printing system. For example, the method 400 can be used to create the 3D printing system 100 described above with respect to FIG. 1. In a brief overview, the method includes coupling a first nozzle to a support structure 410, coupling a second nozzle to the support structure 420, coupling a curing agent to the support structure 430, and connecting a base plate to a bottom portion of the support structure 44).

In some embodiments, a first nozzle can be coupled to a support structure 410. In an embodiment, the first nozzle can be coupled to a track on the support structure. The first nozzle may be configured to move long the track to form objects of various shapes and sizes. In an embodiment, the track may include two vertical poles. The vertical poles may form the frame of the support structure. In some embodiments, a reel may be coupled to the support structure. The reel may feed the first material to the first nozzle.

In some embodiments, the second nozzle can be coupled to the support structure 420. In an embodiment, the second nozzle can be coupled to a track on the support structure. The second nozzle may be configured to move along the track. In other embodiments, the second nozzle may be coupled the support structure in a fixed position. In some embodiments, a reservoir may be coupled to the support structure. The reservoir can be configured to hold a second material to be dispensed by the second nozzle. In an embodiment, at least one dispensing pump may be coupled to the support structure. In some embodiments, at least one dispensing pump may be coupled to the second nozzle via a conduit. The dispensing pump may control the flow of the second material from the reservoir to the second nozzle. The method may include coupling the dispensing pump to the reservoir configured to hold the second material. In an embodiment, the second material travels through at least one conduit from the reservoir to the second nozzle via the dispensing pump.

In some embodiments, the curing agent can be coupled to the support structure 430. In an embodiment, the curing agent may be coupled in a fixed position on the support structure. In other embodiments, the curing agent may be coupled to the track and be configured to move along the track. The curing agent may be coupled above the base plate to solidify the second material. In an embodiment, the curing agent may be UV lamp.

In some embodiments, the base plate can be connected to a bottom portion of the support structure 440. In an embodiment, the base plate may be connected to a bottom portion of the support structure. The bottom portion of the support structure may include a track to guide the base plate. The base plate may be configured to move laterally along the track. Additionally, the base plate may be configured to move in horizontally along the track. In other embodiments, the base plate may be coupled to the support structure in a fixed position.

In an embodiment, at least one blade may be coupled to the support structure. In one embodiment, the blade may be coupled to the track on the support structure. In other embodiments, the blade may be coupled to the second nozzle. The blade may be positioned just above the second layer of the object to level the second material filling the second layer. In some embodiments, the blade may be coupled to the base plate. The base plate may be configured to move laterally under the blade to level the second material filling the second layer. In other embodiments, the base plate may be configured to remain stationary during operation of the second nozzle. In an embodiment, a vibrating element may be coupled to the base plate. The vibrating element may be configured to vibrate the base plate to spread evenly the second material as it is dispensed into the volume of the second layer.

Figure 5:
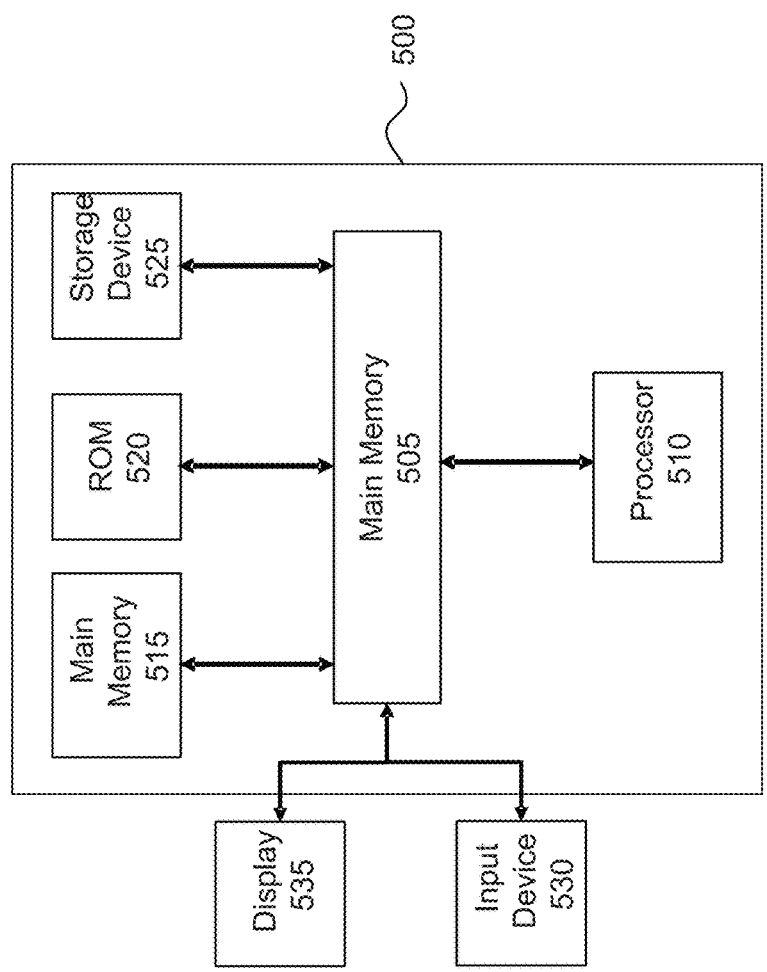
FIG. 5 is a block diagram illustrating a general architecture for a computer system that may be employed to implement various elements of the systems and methods described herein, in accordance with an illustrative embodiment.

FIG. 5 is a block diagram illustrating a general architecture for a computer system that may be employed to implement various elements of the systems and methods described herein, in accordance with an embodiment. In some embodiments, computer system 500 may be employed to control operation and components of a 3D printing system, for example, the 3D printing system described above with respect to FIG. 1. The computer system can include software for creating 3D objects using a 3D printing system. The software may include a program to create a digital model of an object to be printed. In some embodiments, the computer system may include a computer-aided design (CAD) program to create the digital model. The computer system 500 can then control operation of a 3D printing system to create the 3D object.

In some embodiments, a user can access and create a digital model on the computer system 500 via an input device 530. In some embodiments, upon receiving input via the input device 530, processor 510 can access the data structure stored in memory element 505 and execute, perform, or otherwise determine one or more commands to instruct a 3D printing system to form a 3D object, such as the methods as described with respect to FIG. 2.

In some embodiments, the processor 510 may prompt or otherwise request the user of the computer system 500 to provide additional information to facilitate printing the 3D object. In some embodiments, the computer system 500 may be configured to receive a diagram of a 3D object to be printed. The computing system can determine the number of layers to create the object, and characteristics of the layers (for example, thickness, material type).

The processor 510 can generate the material volumes for printing a contour of a layer of the object and transmit the material volume commands to the 3D printing system. In some embodiments, the processor 510 can generate the material volumes for filling in an internal volume of the layer of the object and transmit the volumes to a dispensing pump, such as dispensing pump 150 illustrated in FIG. 1. The computing system 500 can be configured to control the curing agent during the printing process. For example, in some embodiments, the curing agent can be controlled such that the curing agent turns off at pre-determined times to only partially solidify a second material filling in a layer of the 3D object.

In other embodiments, the computer system 500 can be used in a customization process for an object. In one embodiment, the processor 510 can transmit commands to create a brake out plane with the first material. In other embodiments, the processor 510 can transmit commands to create a brake out plane with the second material. The processor 510 can control the curing of the second material by turning off the curing agent at a pre-determined time to only partially solidify the second material. The break-out plane can be solidified enough to support a subsequent layer on top of it, but soft enough to be broken off after the printing process is complete.

The computing system 500 can include a bus 505 or other communication component for communicating information and a processor 510 or processing circuit coupled to the bus 505 for processing information. The computing system 500 can also include one or more processors 510 or processing circuits coupled to the bus for processing information. The computing system 500 also includes main memory 515, such as a random access memory (RAM) or other dynamic storage device, coupled to the bus 505 for storing information, and instructions to be executed by the processor 510. Main memory 515 can also be used for storing position information, temporary variables, or other intermediate information during execution of instructions by the processor 510. The computing system 500 may further include a read only memory (ROM) 520 or other static storage device coupled to the bus 505 for storing static information and instructions for the processor 510. A storage device 525, such as a solid state device, magnetic disk or optical disk, is coupled to the bus 505 for persistently storing information and instructions.

The computing system 500 may be coupled via the bus 505 to a display 535, such as a liquid crystal display, or active matrix display, for displaying information to a user.

An input device 530, such as a keyboard including alphanumeric and other keys, may be coupled to the bus 505 for communicating information and command selections to the processor 510. In another implementation, the input device 530 has a touch screen display 535. The input device 530 can include a cursor control, such as a mouse, a trackball, or cursor direction keys, for communicating direction information and command selections to the processor 510 and for controlling cursor movement on the display 535.

According to various implementations, the processes described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes described herein. One or more processors in a multi-processing arrangement may also be employed to execute the instructions contained in main memory 515. In alternative implementations, hardwired circuitry may be used in place of or in combination with software instructions to effect illustrative implementations. Thus, implementations are not limited to any specific combination of hardware circuitry and software.

Although an example computing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

EXAMPLES

Example 1: 3D Printing System with a Vibrating Element

A digital model of a 3D object is created on a CAD program executing on a computing device. The CAD program divides the 3D object into multiple layers and determine the characteristics of each layer, such as the dimensions and volume of each layer. The computing device is communicatively coupled to a 3D printing system and can transmit commands to the components of the 3D printing system to create the 3D object. The 3D printing system can receive the commands and begin printing the 3D object based on the characteristics of the individual layers.

The 3D printing system includes a support structure that defines the shape of the 3D printing system. The support structure includes a base element with a base plate and two vertical poles attached to the base element. The base plate has a level surface to print a 3D object on. The base plate moves forward and backwards along the base element of the 3D printing system during the printing process. The vertical poles protrude from the base element to define a height of the 3D printing system. The vertical poles are configured to hold a track system for guiding printing nozzles during the printing process. The track changes its distance from the base plate by moving up or down the vertical poles. This movement is controlled by stepper motors coupled to the 3D printing system. The distance from the track to the base plate is dependent upon the object being printed. The 3D printing system further includes two nozzles attached to the track. The first nozzle and the second nozzle are configured to move in a left/right motion along the track. The movement of the first nozzle along the track is also controlled by the stepper motors. A first stepper motor moves the track in the up/down direction via the vertical poles during the printing process. A second stepper motor moves the first nozzle in the left to right and right to left direction along the track during the printing process. A third stepper motor moves the second nozzle in the left to right and right to left direction along the track during the printing process.

The first nozzle is fed plastic wire from a reel attached to the support structure. The reel holds a spool of plastic wire. The first nozzle is configured to melt the plastic wire during a printing process and dispense the melted plastic on the base plate. To print the first layer of the object (the base layer), the first nozzle dispenses the melted plastic uniformly over an area on the base plate. The first nozzle then moves along the track to trace a contour of a second layer with the melted plastic. The contour of the second layer will be about 0.2 mm to about 0.4 mm, resulting in a shallow internal volume to fill.

Once the contour of the second layer is printed, the second nozzle dispenses the melted plastic to fill in the volume formed by the contour with UV curable polymer to complete the second layer. The shape and dimension data for the second layer is transmitted from the computing device to the first nozzle.

Once the second layer is completed, the first nozzle can trace the contour of the third layer on the second layer. Once the contour of the third layer is completed, the second nozzle can fill in the internal volume formed by the contour with UV curable polymer to complete the third layer.

To fill in the contour of the second layer, the second nozzle is attached to a reservoir of UV curable polymer via a tube and dispensing pump. The volume amounts are transmitted from the computing device to the dispensing pump situated between the reservoir and the second nozzle. The second nozzle fills the internal volume formed by the contour of the second layer until the contour is completely filled (for example, to the top of the plane defined by the height of the contour of the second layer). The liquid UV curable polymer filling in the second layer is leveled and evened out by a vibrating element attached to the base plate. As the UV curable polymer is dispensed, the vibrating element gently vibrates the base plate to evenly distribute the liquid material in the contour of the second layer.

Once the contour of the second layer of the object is filled, a UV lamp is turned on to cure the second layer. The UV lamp is coupled to the track above the base plate and heats the entire work surface (for example, the base plate). The UV lamp is configured to continuously cure each layer of the object as it is printed. At substantially the same time the UV lamp is curing the second layer of the object, the first nozzle can trace a contour of a third layer of the object. The third layer can be shallower in depth relative to the second layer to allow the previous layer to continue to be cured after the contour of the third layer is printed on top of the second layer. The curing time of each layer is substantially equal to the time it takes to print the contour of the next layer and to fill the contour. This method improves 3D printing speeds by printing the contour of the next layer while the current layer and previous layers are simultaneously being cured. The contours of each layer can be printed at a slower rate, while the internal volume of previous layers are cured, improving 3D printing speeds without sacrificing accuracy and mechanical properties of the 3D object. This process can continue until all of the layers of the object have been printed and the 3D object is completed.

Example 2: 3D Printing System with a Blade

A digital model of a 3D object is created on a CAD program executing on a computing device. The CAD program divides the 3D object into multiple layers and determines the characteristics of each layer, such as the dimensions and volume of each layer. The computing device is communicatively coupled to a 3D printing system and can transmit commands to the components of the 3D printing system to create the 3D object. The 3D printing system can receive the commands and begin printing the 3D object based on the characteristics of the individual layers.

The 3D printing system includes a support structure that defines the shape of the 3D printing system. The support structure includes a base element with a base plate and two vertical poles attached to the base element. The base plate has a level surface to print a 3D object on. The base plate is configured to move in a horizontal motion (forward/backwards) along the base element and move in a vertical motion (up/down) along the vertical poles. The vertical poles protrude from the base element to define a height of the 3D printing system. The vertical poles are configured to hold a track system for guiding printing nozzles during the printing process. The track changes its distance from the base plate by moving up or down the vertical poles. This movement is controlled by stepper motors coupled to the 3D printing system. The distance from the track to the base plate is dependent upon the object being printed. The 3D printing system further includes two nozzles attached to the track. Both the first nozzle and the second nozzle are configured to move in a left/right motion along the track. The second nozzle is attached at a higher point on the track than the first nozzle to avoid contact or interference with each other during the printing process. The movement of the first nozzle and second nozzles are controlled by the stepper motors. A first stepper motor moves the track up/down the vertical poles during the printing process. A second stepper motor moves the first nozzle in a left to right and right to left direction along the track during the printing process. A third stepper motor moves the second nozzle in a left to right and right to left direction along the track during the printing process.

The first nozzle is fed plastic wire from a reel attached to the support structure. The reel holds a spool of plastic wire. The first nozzle is configured to melt the plastic wire during a printing process and dispense the melted plastic on the base plate. To print the first layer of the object (the base layer), the first nozzle dispensed the melted plastic uniformly over an area on the base plate. The first nozzle then moves along the track to trace a contour of a second layer with the melted plastic. The contour of the second layer will be about 0.2 mm to about 0.4 mm, resulting in a shallow internal volume to fill.

Once the contour of the second layer is printed, the second nozzle dispenses the melted plastic to fill in the volume formed by the contour with UV curable polymer to complete the second layer. The shape and dimension data for the second layer is transmitted from the computing device to the first nozzle.

Once the second layer is completed, the first nozzle can trace the contour of the third layer on the second layer. Once the contour of the third layer is completed, the second nozzle can fill in the internal volume formed by the contour with UV curable polymer to complete the third layer.

The second nozzle moves along the track to evenly dispensing the second material into the internal volume of the second layer. To fill in the contour of the second layer, the second nozzle is attached to a reservoir of UV curable polymer via a tube and dispensing pump. The volume amounts are transmitted from the computing device to the dispensing pump situated between the reservoir and the second nozzle.

The second nozzle fills the internal volume formed by the contour of the second layer until the contour is completely filled (for example, to the top of the plane defined by the height of the contour of the second layer). To level the internal volume formed by the contour of the second layer, a blade is coupled to the support structure. The blade is attached at a fixed height on the support structure and the base plate, with the printed layers on it, and the blade moves evenly across the top of internal volume distributing the UV curable material. The base plate is configured to move down in a vertical direction after each layer is printed to ensure the blade is positioned even with the height of the contour of the next layer. The distance may change about 0.2 mm to about 0.4 mm, depending on the thickness of the corresponding layer just printed.

Once the contour of the second layer of the object is filled and leveled, a UV lamp is turned on to cure the second layer. The UV lamp is coupled to the track above the base plate. The UV lamp is positioned at approximately the same height as the second nozzle and floods the entire work surface (for example, the base plate). The UV lamp is configured to continuously cure each layer of the object as it is printed. At substantially the same time the UV lamp is curing the second layer of the object, the first nozzle can trace a contour of a third layer of the object. The third layer can be shallower in depth relative to the second layer to allow the previous layers to continue to be cured after the contour of the third layer is printed on top of the second layer. The curing time of each layer is substantially equal to the time needed to print the contour of the next layer and to fill the contour. This method improves 3D printing speeds by printing the contour of the next layer while the current layer and previous layers are simultaneously being cured. The contours of each layer can be printed at a slower rate, while the internal volume of previous layers are cured, improving 3D printing speeds without sacrificing accuracy and mechanical properties of the 3D object. This process can continue until all of the layers of the object have been printed and the 3D object is completed.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more circuits of computer program instructions, encoded on one or more computer storage media for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (for example, multiple CDs, disks, or other storage devices).

The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, for example, an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuit, component, subroutine, object, or other unit suitable for use in a computing environment. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more circuits, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto optical disks, or optical disks. However, a computer need not have such devices. Moreover, a computer can be embedded in another device, for example, a mobile telephone, a personal digital assistant (PDA), a mobile audio or video player, a game console, a Global Positioning System (GPS) receiver, or a portable storage device (for example, a universal serial bus (USB) flash drive), to name just a few. Devices suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, for example, a CRT (cathode ray tube) or LCD (liquid crystal display) monitor, for displaying information to the user and a keyboard and a pointing device, for example, a mouse or a trackball, by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input.

One or more flow diagrams may have been used herein. The use of flow diagrams is not meant to be limiting with respect to the order of operations performed. The herein described subject matter sometimes illustrates different components contained within, or connected with, different other components. It is to be understood that such depicted architectures are merely illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," and so on). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, and so on" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, and so on). In those instances where a convention analogous to "at least one of A, B, or C, and so on" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, and so on). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:
   forming, by a first nozzle, a base layer of an object;
   forming, by the first nozzle, a contour of a second layer of the object on the base layer, the contour defining a volume within the second layer;
   filling, by a second nozzle, at least a portion of the volume within the second layer of the object with a material, the contour and the material forming the second layer; and
   solidifying, by a curing agent, the material in the second layer of the object and simultaneously forming, by the first nozzle, a contour of a third layer of the object on at least a portion of the second layer such that an amount of time required to solidify the material in the second layer is about the same as an amount of time required to form the contour of the third layer.

2. The method of claim 1, wherein the contour of the third layer defines a volume within the third layer, the method further comprising:
   filling, by the second nozzle, at least a portion of the volume within the third layer of the object with a material, the contour and the material forming the third layer,
   wherein forming the contour of the third and subsequent layers occurs at substantially the same time as solidifying of the material in the previous layers.

3. The method of claim 1, further comprising vibrating, by a vibrating element, the base plate to evenly distribute the material across the volume defined by the contour of the second layer of the object.

4. The method of claim 1, further comprising leveling, by a blade, the second layer of the object prior to creating the contour of the third layer of the object.

5. The method of claim 1, wherein solidifying the material in the second layer of the object comprises exposing the material in the second layer of the object to radiation from a UV lamp, to heat or a combination thereof.

6. The method of claim 1, wherein the curing agent is configured to be inactive after a predetermined time, and wherein at least a portion of the material in the second layer of the object is at least partially solidified at the predetermined time.

7. The method of claim 1, wherein the curing agent is configured to provide radiation at an intensity that partially solidifies the material in the second layer of the object, wherein a surface of the material in the second layer of the object retains an adhesive characteristic for coupling the second layer of the object to the third layer of the object; and wherein the intensity of the curing agent is configured to completely solidify the material in the second layer of the object after one or more additional layers have been formed on top of the second layer.

8. The method of claim 1, further comprising washing an outer surface of the object with a solvent.

9. The method of claim 1, further comprising:
   controlling, by a processor, operation of at least one of the first nozzle, the second nozzle, and the curing agent;
   calculating, by the processor, an amount of material to fill the volume within the second layer of the object; and
   transmitting, by the processor, a command to a dispensing pump, wherein the command comprises an instruction to fill the volume within the second layer of the object with the amount of material.

10. A method comprising:
    coupling a first nozzle to a support structure, the first nozzle configured to form a base layer of an object and to form a contour of a second layer of the object with a first material, the contour defining a volume within the second layer;
    coupling a second nozzle to the support structure, the second nozzle configured to at least partially fill the volume within the second layer with a second material, the contour and the second material forming the second layer;
    coupling a curing agent to the support structure, the curing agent configured to solidify the second material;
    simultaneously forming, by the first nozzle, a contour of a third layer of the object on at least a portion of the second layer such that an amount of time required to solidify the second material is about the same as an amount of time required to form the contour of the third layer; and
    connecting a base plate to a bottom portion of the support structure, wherein the first nozzle moves independently of the second nozzle.

11. The method of the claim 10, further comprising:
coupling a dispensing pump to the second nozzle via a conduit; and
coupling the dispensing pump to a reservoir configured to hold the second material.

12. The method of claim 10, further comprising:
coupling a vibrating element to the base plate; and
coupling a blade to the second nozzle, wherein the blade is positioned above the second layer of the object, and wherein the blade is configured to level the second layer of the object.

\* \* \* \* \*